N. H. ANDERSON.
TYPE WRITING MACHINE.
APPLICATION FILED JUNE 12, 1914.
1,200,067.
Patented Oct. 3, 1916.
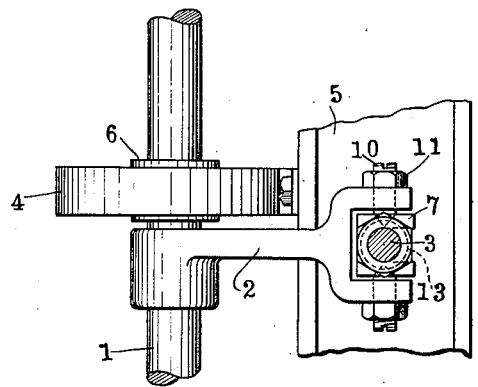
Fig.1.
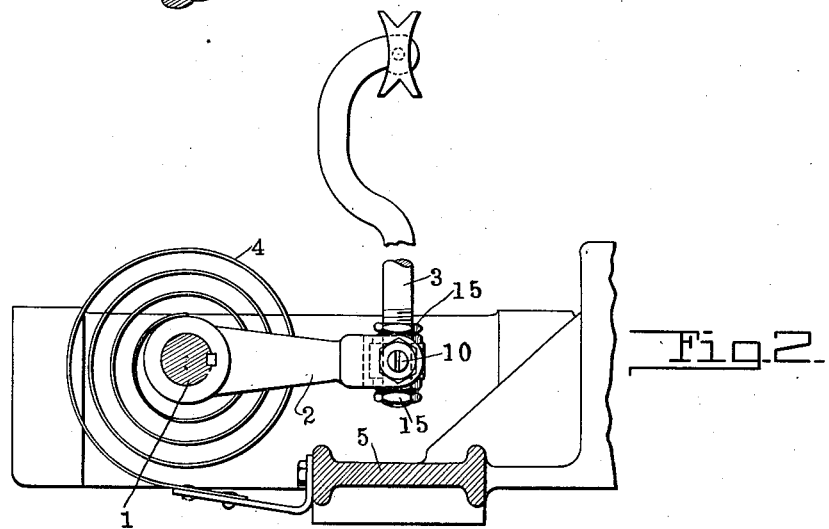
Fig.2.
Fig.3.
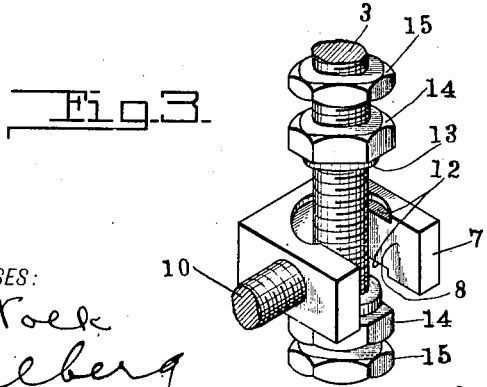
WITNESSES:
C. F. Toelk
O. Kulberg
INVENTOR
N. H. Anderson
BY
Duell, Warfield & Duell
ATTORNEYS

UNITED STATES PATENT OFFICE.

NILS H. ANDERSON, OF MIDDLETOWN, CONNECTICUT, ASSIGNOR TO THE NOISELESS TYPEWRITER COMPANY, OF MIDDLETOWN, CONNECTICUT, A CORPORATION OF CONNECTICUT.

TYPE-WRITING MACHINE.

1,200,067.           Specification of Letters Patent.           Patented Oct. 3, 1916.

Application filed June 12, 1914. Serial No. 844,656.

*To all whom it may concern:*

Be it known that I, NILS H. ANDERSON, a citizen of the United States, residing at Middletown, in the county of Middlesex and State of Connecticut, have invented certain new and useful Improvements in Type-Writing Machines, of which the following is a full, clear, and exact description, such as will enable others skilled in the art to which it appertains to make and use the same.

This invention relates to typewriting machines and with regard to certain more specific features thereof, to improvements in the shifting mechanism and the construction and adjustability of certain parts thereof.

One of the objects of the present invention is to provide a simple and practical connection permitting a semi-universal movement between two parts.

A further object is to provide a connection between two parts which will permit the parts to be easily assembled and disassembled.

A further object is to provide a mechanism of the first above-mentioned character which will be cheap to manufacture and permit freedom of movement of the various parts without binding.

A further object is to provide a connection between two parts of the shifting mechanism which will permit a rapid, easy and accurate adjustment thereof.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, in which is illustrated one of the various possible embodiments of the several features of the invention, Figure 1 is a plan view of such parts of the shifting mechanism and frame structure of a typewriting machine as are necessary to understand the present invention; Fig. 2 is a side elevational view, certain parts being in section; and Fig. 3 is an enlarged detail perspective view of the connection.

Similar reference characters refer to similar parts throughout the different views of the drawing.

While the present invention will hereinafter be described with relation to the shifting mechanism of a noiseless typewriting machine, such as shown, for example, in the copending application of Nils H. Anderson for improvements in typewriting machines, filed March 17, 1910, Serial No. 550,066, it is, of course, to be understood that the invention is applicable to other forms of machines as well as to connections between two parts of other mechanisms.

Without going into a detailed explanation of the entire shifting mechanism and all of the various parts connected therewith, it is sufficient to state that a rock shaft 1 is adapted to be actuated or rotated in one direction or the other, according to whether upper and lower-case characters are to be printed; this noiseless machine being of the double shift style. This rock shaft has keyed or otherwise rigidly secured thereon, a rearwardly extending arm 2 having trunnioned in its forked rear end a vertically disposed shaft or connection 3. This shaft, and the corresponding shaft at the opposite side of the machine are adapted to be connected at their upper ends with a shift rail upon which the carriage reciprocates during the printing operation and its return to line-commencing position. As these parts are duplicated on the opposite side of the machine, it is believed to be unnecessary to show or describe them in detail.

A balance spring 4, preferably in the form of a spiral about the rock shaft 1 is adjustably connected at its outer end to a transverse supporting member 5, while its inner end is secured to a collar 6 which may or may not be adjustably mounted upon the shift rail, as desired. This balance spring, it will be seen, is tensioned when the carriage moves either upwardly or downwardly and tends to balance the weight of the carriage more than to aid in its return to normal position.

The present invention deals more specifically with a connection between the rearwardly extending forked arm 2 and the vertically disposed shaft or link 3 supporting the carriage. The lower part of this link is threaded and passes through a trunnion block 7 open at one side 8 in an amount substantially equal or slightly greater than the maximum diameter of the threaded portion of the link whereby this block may be moved laterally relatively to the shaft when assembling or disassembling the parts. This block is preferably of angular form and is provided at its opposite sides with conical recesses adapted to receive the pointed ends of trunnion screws 10 passing through each part of the forked rear end of the rearwardly extending arm 2. Check nuts 11 are provided upon the adjusting screws to hold the same in proper position. The upper and lower surfaces of this trunnion block are countersunk, or depressed, substantially as shown at 12 in the detailed view, Fig. 3, or, in other words, they are provided with an upwardly projecting annular collar extending all around the depressed surface except where the block is cut away at 8 on one side as above explained. This construction permits the reception of the shouldered annular portions 13 of the adjusting nuts 14 threaded on the link both above and below the trunnion block so that when these parts are brought relatively close to each other the shouldered portions will be below the plane of the flange, or substantially coincident with the planes of the upper and lower countersunk surfaces whereby a removal of the trunnion block is positively prevented. Both above and below, or rather adjacent the exterior surfaces of the adjusting nuts 14 are provided check nuts 15 which may be clamped down on the exposed or upper surfaces of the adjusting nuts 14 in order to hold them in proper adjusting position. The purpose of the adjusting nuts is to adjust the effective length of the link 3 so as to bring the shift rail with which it is connected at its upper end into parallelism with the rock shaft 1. In order to avoid possible cramping of the connecting links due to the tightening of the adjusting nuts on the trunnion block in actual practice, the nuts are not tightened against the trunnion block 7 but are left slightly loose so that there is possible a slight vertical movement in the connecting link 3, the actual movement in practice amounting to about .003 of an inch. If it were attempted to tighten the nuts against the trunnion block it might happen that on account of the slight variations in the shape of the trunnion, a sufficient amount of side strain might be put upon one connecting link at its upper end where it engages the shift rail, to cause a considerable amount of friction and sluggishness in the shift action, and by leaving the nuts loose this is entirely prevented. The trunnion block being mounted on pivot screws, secures also a very light and free turning movement on the trunnion as the shift rock shaft is oscillated.

It is believed that the operation of this mechanism is clear from the above description and requires no further explanation. It might be pointed out, however, that the present construction permits of rapid assembling or disassembling of the parts as might be necessary in replacing worn or broken parts, for example. By loosening the check nuts 15 above and below the adjusting nuts 14, each a sixteenth of an inch, and then correspondingly loosening the adjusting nuts 14, the link carrying these nuts may be slipped out laterally through the cutaway portion 8 of the trunnion block 7 which is carried in the forked end of the lever 2 connected with the shift rock shaft 1. This construction, of course, eliminates the necessity of entirely removing the lower check nut and adjusting nut and then depressing the connecting arms, a distance sufficient to slip the trunnion block over the free end of the connecting link, or removing the trunnion screws, thereby saving a great deal of time, trouble and expense.

From the above description it will be seen that the present invention provides a simple and practical construction of connection between the moving parts of a typewriting machine designed to permit rapid and accurate adjustments to alter the effective length of the associated parts as may be necessary. In short, the invention is believed to accomplish among others, all the objects and advantages above set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:—

1. In a connection, in combination, a trunnioned block open at one side, a link passing through said block, and a nut threaded on said link engaging said block to prevent the link being withdrawn through the open side.

2. In a connection, in combination, a trunnioned block open at one side, a link passing through said block, and nuts threaded on said link engaging opposite sides of said block adapted to prevent the said link being withdrawn through the open side of said block.

3. In a connection, in combination, a block, trunnions supporting said block, said block being open at one side and provided with recesses on its upper and lower surfaces, a link passing loosely through said block, and means on said link engaging said recessed surfaces adapted to prevent the link being withdrawn through the open side of said block.

4. In a connection, in combination, a block, trunnions supporting said block, said block being open at one side and provided with recesses on its upper and lower surfaces, a link passing loosely through said block, and collared nuts threaded on said link adapted to engage the recessed surfaces of said block when screwed into engagement therewith to prevent a withdrawal of said link through said block.

5. In a connection, in combination, a block, trunnions supporting said block, said block being open at one side and provided with recesses on its upper and lower surfaces, a link passing loosely through said block, collared nuts threaded on said link adapted to engage the recessed surfaces of said block when screwed into engagement therewith to prevent a withdrawal of said link, and check nuts threaded on said link engaging the exposed surfaces of said first-mentioned nuts for holding them in adjusted position.

6. In a connection, in combination, a trunnioned block having recesses in its upper and lower surfaces, a link passing through said block, and means on said link engaging said recesses.

7. In a connection, in combination, a forked arm, a trunnioned block carried thereby, a link positioned at right angles to said arm passing through said block, and adjusting nuts on said link for regulating the relative position of said arm and link.

8. In a connection, in combination, a forked arm, a trunnioned block carried thereby, a link positioned at right angles to said arm passing through said block, and adjusting nuts on said link for regulating the relative position of said arm and link, said block being provided with recesses on its upper and lower sides adapted to be engaged by said nuts and being cut away on another side to permit a removal of the link when the nuts are withdrawn from the recesses.

9. In a connection, in combination, a rock shaft, a rail, an intervening mechanism therebetween including a forked arm, a link connected with the rail, a trunnion in said forked arm, and adjusting means threaded on said link for adjusting the point of connection between the arm and link.

10. In a connection, in combination, a rock shaft, an arm keyed thereon having a forked free end, a trunnioned block in said forked end having recessed upper and lower surfaces and cut away at one side, a link disposed at an angle to said arm adapted to be inserted through said cut away portion to pass through said trunnioned block, and means carried by said link adapted to engage the recessed portions to prevent a withdrawal of said link through said cut away side.

11. In a connection, in combination, a rock shaft, an arm keyed thereon having a forked free end, a trunnioned block in said forked end having recessed upper and lower surfaces and cut away at one side, and collared nuts threaded on said link, the collars of which are adapted to engage said recessed surfaces.

12. In a connection, in combination, a rock shaft, an arm keyed thereon having a forked free end, a trunnioned block in said forked end having recessed upper and lower surfaces and cut away at one side, collared nuts threaded with said link, the collars of which are adapted to engage said recessed surfaces, and check nuts threaded on said link above and below said adjusting nuts for holding the nuts in fixed relation.

13. In a typewriting machine, in combination, a shift rail for supporting a carriage, a shift rock shaft connected therewith for moving said shift rail, and an adjustable connection associated with said parts comprising an open sided trunnioned block, a link passing through the block and adjusting and securing nuts on said link engaging said block.

14. In a typewriter, in combination, a trunnion block having a vertical opening and adjacent recesses on its upper and lower surfaces, a link having a threaded portion seated in said opening, and adjusting nuts threaded on said link to loosely rest in said block recesses for retaining said link and block together.

In testimony whereof I affix my signature, in the presence of two witnesses.

NILS H. ANDERSON.

Witnesses:
ALBERT H. GRISWOLD,
J. FILMORE DRUTON.